1

3,290,384
ARALKYL HYDROPEROXIDE PRODUCTION
Theodore Largman, Madison, N.J., and Ronald N. Holmes, Philadelphia, Pa., assignors to Allied Chemical Corporation, New York, N.Y., a corporation of New York
No Drawing. Filed July 25, 1963, Ser. No. 297,702
8 Claims. (Cl. 260—610)

This invention relates to oxidation of aralkyl hydrocarbons and nuclear substitution products thereof to aralkyl hydroperoxides. More particularly this invention relates to said oxidation in presence of a specific class of heavy metal catalysts.

It has been proposed in U.S. Patent 2,655,545 of Oct. 13, 1953, to Bruening et al., to oxidize aralkyl hydrocarbons, in particular cumene, to the corresponding hydroperoxides using as catalyst a transition metal compound dissolved in the reaction mixture at low concentration. The conversions to hydroperoxide and reaction rates obtained with the catalysts of this patent leave something to be desired.

We have now found that very good reaction rates and yields and relatively high levels of conversion of an aralkyl compound having at least one tertiary alkyl group attached via a tertiary carbon atom to the aryl ring, to its hydroperoxide are obtained in oxidation of such compound in liquid phase by elemental oxygen, using as catalyst an alkali or alkaline earth metal salt of an oxy acid of one of the four adjacent metals of the periodic table having atomic numbers 50, 51, 82 and 83 wherein said metals are at their highest valences. The additives or catalysts used in accordance with out invention are accordingly alkali metal or alkaline earth metal plumbates, bismuthates, stannates and antimonates.

Typical aralkyl hydrocarbons and substituted aralkyl hydrocarbons which can be oxidized by our process include isopropyl benzene (cumene); diisopropylbenzenes; 2-hydroxy-2-propyl-substituted isopropylbenzenes; cymenes; isopropylnaphthalenes; cumenes substituted in the ring by halogen, especially chlorine or fluorine; isopropyldiphenyls; etc.

Temperatures which can be used for the oxidation range from about 50° C. to about 150° C., preferably about 60° C.–120° C. The oxidizing gas can suitably be air; if desired e.g. to minimize evaporation of the hydrocarbon and/or to obtain higher oxidation rate and correspondingly less decomposition of the cumene hydroperoxide product at given temperature, the air can be under pressure or gases richer in oxygen than air can be used.

Our additives or catalysts can be used alone or in admixture, and if desired can be admixed with other additives previously proposed for oxidation of aralkyl compounds to aralkyl hydroperoxides. The quantities of our additives which can be used will vary depending upon, in particular, the purity and oxidizability of the particular hydrocarbon, e.g. cumene used as feed. When the cumene is of high purity, free from acids, and readily oxidized without long induction periods, even without an additive, then the quantities of additive can be small, e.g. as small as 0.01% by weight of the cumene feed; but the quantities must be sufficient to maintain effective contact, during oxidation, between the solid surface of the additive or catalyst, the liquid cumene being oxidized, and the dissolved and/or dispersed elemental oxygen. In absence of adequate contact, we believe the specific directive effect of our additives favoring hydroperoxide formation and/or their activity for oxidation is impaired. Much larger quantities of our additives can be used without adverse effects, and if the period of use of the additive or catalyst is to be prolonged or if the cumene is of relatively poor quality, it is advisable to use quantities as high as 10% of the additive by weight of the cumene feed.

The quantity of our additive or catalyst to be used will be dependent upon the surface area per gram of the additive, i.e. upon the state of subdivision, lower surface areas per gram (coarser particles of additive) requiring higher weight of additive per unit weight of cumene feed to maintain, during the oxidation, effective surface contact of additive or catalyst with cumene being oxidized. Preferred amounts of additive are ordinarily from about 0.05%–1% by weight of the cumene feed whereby the additive is maintained in contact with the cumene being oxidized and no extensive filtration is required. Amounts used preferably suffice to maintain average cumene hydroperoxide production rate of at least about one weight percent per hour and cumene hydroperoxide yield of at least 90% by weight of the non-volatile oxidation products, at cumene hydroperoxide concentrations reaching at least 20% by weight in the oxidation reaction mixture.

The plumbates have been found to be distinctly more effective than the other additives of our invention in terms of increasing the oxidation rate of cumene to cumene hydroperoxide while maintaining good yields, and accordingly the plumbates are preferred.

High yields of hydroperoxide, based on hydrocarbon reacted, are obtained in accordance with our invention whereby loss of valuable materials is minimized and difficulties in isolating and using the ultimate products desired are minimized. Accordingly the process of our invention is very suitable for preparing cumene hydroperoxide for use as a peroxy catalyst or as a reactant for decomposition to phenol and acetone, etc.

The best mode contemplated by us of carrying out our invention can be set forth as follows:

Cumene of good purity is used, treated to remove any acidic materials e.g. by washing with aqueous alkali, drying over sodium carbonate or calcium sulfate, and distilling; or by washing with aqueous alkali and then with water and completely separating the washed cumene from the aqueous layer to provide a clear, dry cumene feed. Such cumene is supplied, preferably continuously, to one or more oxidation towers to which air at about atmospheric pressure is also supplied. The air is dispersed in the liquid reaction mixture e.g. by a frit and/or by stirring or the like. When a hydrolyzable material such as sodium plumbate is to be the additive or catalyst this air should be dried e.g. by passage through silica gel or through traps at −78° C. to avoid hydrolytic attack on the catalyst, which depresses its activity. The air flow is adjusted for utilization of about 90% of the oxygen content of the air. An additive of our invention is supplied as a powder in the reaction mixture in amounts of about 0.1%–1% by weight of the reaction mixture and is kept suspended by the air flow and by any stirring employed.

The reaction mixture is maintained at a temperature in the range from about 60° C. to about 120° C. The oxidation to cumene hydroperoxide is exothermic, and the temperatures used will desirably be chosen to give reaction rates at which the heat developed approximately balances the heat losses from the particular tower or towers employed, whereby little or no external heating or cooling is required. Temperatures in the lower ranges are generally preferred as permitting oxidation to relatively high concentrations of cumene hydroperoxide while maintaining high yields; but too low temperatures will result in unsatisfactory oxidation rates.

The oxidation is suitably carried out continuously in a series of vessels each operating at higher cumene hydroperoxide concentration than the preceding, and the last vessel suitably being operated at concentration in the range of about 20%–40% cumene hydroperoxide by weight of the reaction mixture; and not above the concentration level, varying with temperature, additives, oxygen, partial pressure, oxygen dispersion, etc., at which rates and yields are found to drop excessively. Fresh additive or catalyst will generally be supplied to the first oxidation vessel or zone and can be supplied as needed in any of the subsequent oxidation zones in which a drop in rate or yield, indicating catalyst poisoning, may be noted during the operation of the process.

The resulting reaction mixture is withdrawn and separated from the solids therein by decantation, filtration or the like; and the solid additive can then be discarded or regenerated e.g. by washing with acetone and/or recycled for use in oxidation of further quantities of cumene. Unoxidized cumene can be recovered from the oxidation reaction mixture, e.g. by distillation, and recycled to the oxidation, suitably after washing the cumene with aqueous alkali to remove any phenol and/or acids therein and separating clear, dry cumene for recycle.

The examples which follow described completely specific embodiments of our invention and are illustrative of the invention but it is not intended that the invention should be limited to all the specific details of these examples.

The cumene used in the examples was of good purity and high oxidizability. It had been purified by careful fractionation, followed by 5 sulfuric acid washes, a water wash, a sodium hydroxide wash and 2 final water washes. The washed cumene was dried over sodium carbonate and fractionated, the heart cut, boiling at 91° C. and 114 mm., being employed. Its index of refraction was $N_D^{20.5}=1.4902$. The air used in Example 1 was dried by passage through a calcium sulfate ("Drierite") column.

EXAMPLE 1

I. Oxidation

*Reactor:* A 3-liter glass vessel provided with stirrer, reflux condenser, thermocouple well, and air inlet leading to a glass frit at the bottom of the vessel.

*Charge to reactor:*

Cumene—1950 grams.
CHP (86% concentrated oxidation product)—50 grams.
$Na_2SnO_3 \cdot 3H_2O$, powdered—4.0 grams.

The charge was maintained by a thermostatted oil bath at 103° C. while air was sparged through at the rate of 120 liters/hr. (STP), with vigorous stirring. The oxidation was terminated when the cumene hydroperoxide concentration reached 30.03 weight percent, as determined by standard iodometric method (Siggia, "Quantitative Organic Analysis via Functional Groups," 2nd edition, pages 148–149). The overall rate of formation of cumene hydroperoxide was 3.0 weight percent per hour.

II. Concentration

The resulting oxidation mixture (2112 grams) was charged to a distillation apparatus and the cumene was taken overhead at 50–55° C./15–70 mm. pressure. The distillation flask was warmed by immersing in hot water, the temperature of which was not permitted to go above 80° C. The pH of an aqueous extract of the distilled cumene employing 2 volumes of water per volume of distilled cumene was 6.6, indicating no excessive production of acids under our conditions. The concentrate weighed 718 grams and contained 82.1 weight percent cumene hydroperoxide, i.e. 589.5 grams.

III. Decomposition of cumene hydroperoxide

A cylindrical 6 inch x 2 inch jacketed reaction vessel fitted with stirrer, reflux condenser, and overflow tube was charged with 85 grams phenol, 52 grams acetone and 15 grams cumene. This mixture was stirred and maintained at 77° C. by refluxing carbon tetrachloride in the jacket.

Decomposition of the above cumene hydroperoxide product was started by slowly adding 1.1% $SO_2$ in cumene so as to maintain a concentration of 200 p.p.m. $SO_2$ in the decomposition reaction mixture, then pumping the cumene hydroperoxide concentrate of the above operation II into the reaction vessel at the rate of 9.2 cc./min. The increment was removed by overflow, arranged to allow thorough back mixing. The resulting residence time was 23 minutes. Once the reaction was initiated, no external application of heat was necessary as the reaction is exothermic.

Upon completion of the run the system was flushed with 100 grams of cumene. The reaction mass was then slurried with 1.0 weight percent of powdered sodium bicarbonate to neutralize the excess $SO_2$, and filtered.

| Material Balance | In | Out |
|---|---|---|
| CHP Concentrate | 717 grams | |
| Phenol | 85 | |
| Acetone | 52 | |
| Cumene | 15 | |
| Cumene-$SO_2$ | 11 | |
| Cumene Wash | 100 | |
| | 980 grams | 976 grams |

IV. Phenol recovery

A portion (922 grams) of the filtered decomposition product obtained in the above operation III and 50 grams of sym-triisopropylbenzene, employed as a chaser, was charged to a distillation flask and distilled through a 3 ft. packed column filled with Penn State packing. The following cuts were obtained:

| Cut No. | Head Temp., °C. | Pressure, mm. Hg. | Quantity, Grams | Product |
|---|---|---|---|---|
| 1 | 58 | 760 | 235 | Acetone. |
| 2 | 64 | 34 | 214 | Cumene. |
| 3 | 40–72 | 10 | 26 | Intermediate cut. |
| 4 | 75 | 10 | 377 | Phenol. |
| 5 | 75–88 | 10 | 41 | Intermediate cut, post phenol. |
| Residue | | | 60 | |
| Trap (chiefly volatiles) | | | 17 | |
| | | | 970 | |

Gas chromatographic analysis of the intermediate cuts and trap contents indicates the presence of an additional 38.3 grams of phenol. The yield of phenol based upon the quantity of cumene hydroperoxide decomposed was thus about 97% of theory. The quantities of non-phenolic oxidation by-products (acetophenone, alpha-methylstyrene, etc.) analyzed in the intermediate cuts, residue, and trap contents amounted to 40.8 grams, whence the original cumene hydroperoxide yield is calculated to be at least 93% by weight of the oxidation reaction products.

EXAMPLES 2–12

The following runs were carried out using conditions shown in the table below. The results were as set out in the table. The runs labelled "Blank A," "Blank B" and "Blank C" were carried out under condition known to be very suitable for cumene oxidation to cumene hydroperoxide, namely using powdered sodium carbonate (with and without powdered calcium carbonate) as catalyst, in the same quantity of 0.25 gram per 200 grams of cumene as used for the catalysts of our invention tested as set out below.

The reaction vessel was of glass, fitted with stirrer, reflux condenser, thermocouple well, and air inlet leading to a fritted disc for dispersing air upward through the oxidation reaction mixture. The temperature of the reaction mixture was maintained by a thermostatted oil bath. The air was dried by passage through a calcium sulfate ("Drierite") column and a molecular sieve column. The cumene was as for Example 1.

TABLE

| Example No. | 2 | 3 | 4 | Blank "A" | 5 | 6 |
|---|---|---|---|---|---|---|
| Cumene (grams) | 200 | 200 | 95 | 200 | 200 | 200. |
| Air Flow (liters/hr., STP) | 30 | 30 | 14 | 30 | 40 | 40. |
| Temperature (° C.) | 102 | 110 | 125–129 | 103 | 103 | 103. |
| Reaction Time (hr.) | 10 | 6 | 3.5 | 11 | 7 | 6.8. |
| Catalyst, powdered | $Na_2SnO_3 \cdot 3H_2O$ | $Na_2SnO_3 \cdot 3H_2O$ | $Na_2SnO_3 \cdot 3H_2O$ | $Na_2CO_3$ / $CaCO_3$ | $Na_2SnO_3 \cdot 3H_2O$ | $CaSnO_3 \cdot (3.3H_2)$. |
| Grams added | 0.2 | 0.125 | 0.0625 | {0.25 / 0.25} | 0.25 | 0.25. |
| CHP[1] Conc. (wgt. percent): | | | | | | |
| Initial[2] | 1.23 | 1–1.5 | 1–1.5 | 1–1.5 | 3.9 | 4.8. |
| Final | 33.0 | 23.5 | 27.5 | 33.0 | 23.7 | 26.5. |
| Avg. Rate CHP Production (wgt. percent/Hr.) | 3.2[5] | 3.7 | 7.6 | 2.9 | 2.8 | 3.2. |
| CHP Purity (wgt. percent)[3] | 95.2 | 97.5 | 90.6 | 96.5 | | |
| pH of Reaction Mixture[4] | | | | | | |

| Example No. | 7 | 8 | 9 | Blank "B" |
|---|---|---|---|---|
| Cumene (grams) | 200 | 200 | 200 | 200. |
| Air Flow (liters/hr., STP) | 40 | 40 | 40 | 40. |
| Temperature (° C.) | 103 | 103 | 103 | 103. |
| Reaction Time (hr.) | 7 | 9.2 | 3.25 | 9.6. |
| Catalyst, powdered | $NaBiO_3$ | $Na_2Sb_2O_6 \cdot \tfrac{1}{2}H_2O$ | $Na_2PbO_3 \cdot 3H_2O$ | $Na_2CO_3$. |
| Grams added | 0.25 | 0.25 | 0.25 | 0.25. |
| CHP[1] Conc. (Wgt. percent): | | | | |
| Initial[2] | 3.8 | 2.3 | 2.8 | 2.4. |
| Final | 32.0 | 30.4 | 31.8 | 30.2. |
| Avg. Rate CHP Production (wgt. percent/hr.) | 4.0 | 3.1 | 8.9 | 2.9. |
| CHP Purity (wgt. percent)[3] | | | | |
| pH of Reaction Mixture[4] | 4.7 | 4.2 | 5.5 | 6.3. |

| Example No. | 10 | 11 | 12 | Blank "C" |
|---|---|---|---|---|
| Hydrocarbon Oxidized (grams) | p-Diisopropylbenzene (200 g.) | p-Cymene (100 g.) | p-Cymene (100 g.) | p-Cymene (100 g.). |
| Air Flow (liters/hr., STP) | 40 | Oxygen 15 l./hr. | Oxygen 15 l./hr. | Oxygen 15 l./hr. |
| Temperature (° C.) | 103 | 110 | 110 | 110. |
| Reaction Time (hr.) | 5 | 7 | 4 | 3. |
| Catalyst, powdered | $NaBiO_3$ | $NaBiO_3$ | $Na_2PbO_3 \cdot 3H_2O$ | $Na_2CO_3$. |
| Grams added | 0.25 | 0.12 | 0.12 | 0.12. |
| CHP[1] Conc. (wgt. percent): | | | | |
| Initial[2] | 4.4[6] | 3.8 | 1.9 | 2.1. |
| Final | 49.5 | 13.7 | 8.7 | 5.5. |
| Avg. Rate CHP Production (wgt. percent/hr.) | 9.0 | 1.4 | 1.7 | 1.1. |
| CHP Purity (wgt. percent)[3] | | | | |
| pH of Reaction Mixture[4] | 5.1 | | | |

[1] "CHP" designates cumene hydroperoxide.

[2] A little cumene hydroperoxide was added to the charge for each run.

[3] "CHP purity" was determined by adding distilled water in amount equal to sample weight less cumene hydroperoxide weight (about 2 grams of water) to a weighed sample of the final oxidation reaction mixture in a test tube; and driving off cumene and all of the water by bubbling air through the sample heated at 60° C. The air flow through the heated sample is continued a further 20 minutes to remove the last of the cumene and/or water. The residue is weighed; its excess weight over its analyzed cumene hydroperoxide content represents the proportion of impurity.

[4] Determined on aqueous extract of filtered reaction mixture at end of run, using 2:1 volume ratio of distilled water:reaction mixture.

[5] Breakdown for Example 2:

| Time (hr.) | CHP Concentration (wgt. percent) | Successive Rates (wgt. percent CHP/hr.) |
|---|---|---|
| 0 | 1.23 | |
| 1 | 2.52 | 1.29 |
| 2 | 4.75 | 2.23 |
| 7 | 20.80 | 3.21 |
| 9 | 29.00 | 4.10 |
| 10 | 33.30 | 4.30 |

[6] CHP used to initiate reaction; initial concentration of hydroperoxide is calculated as the monohydroperoxide of p-diisopropylbenzene for Example 10.

EXAMPLE 13

An apparatus as for Examples 2–12 was adapted for continuous operation by providing an overflow tube and an inlet through which cumene could be continuously pumped. The exit gases were passed to an oxygen analyzer allowing determination of the total oxygen consumed over any given time period.

This reactor was charged with 162 grams of cumene purified as for Example 1, plus 2.9 grams cumene hydroperoxide (supplied as 80% concentrated oxidation product). The reactor was heated over the course of ½ hour to 103° C. by the thermostatted oil bath, then a flow of air (dried through 2 solid carbon dioxide traps) at 32 liters/hour (S.T.P) was commenced, and 0.200 gram of $Na_2PbO_3 \cdot 3H_2O$ powder was supplied to the reaction mixture. A sample of the reaction mixture was taken at this point and about each hour thereafter during the run, and analyzed iodiometrically for cumene hydroperoxide concentration in weight percent.

The pump was started after the air had been flowing about 4 hours, when the cumene hydroperoxide concentration reached about 20%; and the rate of cumene feed was thereafter regulated to maintain about a 20% cumene hydroperoxide concentration during the run. The results obtained are tabulated below:

| Time After Start of Air Flow (Hours) | Measured Total of Oxygen Consumed (mol) | Measured Total Cumene Hydroperoxide Formed (mol) | Percent Calculated Yield, in Mols Cumene Hydroperoxide Formed per 100 Mols Oxygen Consumed |
|---|---|---|---|
| 2.5 | 0.115 | | |
| 3.0 | | 0.12 | 12/.135*=89.0 |
| 3.5 | .155 | | |
| Start Pump 4.0 | | .175 | 17.5/.185*=94.5 |
| 4.5 | .225 | .185 | 18.5/.225=82.3 |
| 5.5 | .302 | .265 | 26.5/.305=87.0 |
| 6.5 | | .33 | 33/.375*=88.0 |
| 7.5 | .445 | .385 | 38.5/.445=86.5 |
| 8.1 | .475 | .425 | 42.5/.475=89.5 |
| 9.1 | .52 | .465 | 46.5/.52=87.5 |
| 10.1 | .56 | .515 | 51.5/.56=92.0 |
| 12.1 | | .57 | 57/.635*=90.0 |
| 13.1 | .67 | .60 | 60/.67=89.5 |

*Figure obtained by interpolation.

During the operation at 20% cumene hydroperoxide concentration, an initial period was observed in which cumene hydroperoxide was formed at practically constant rate, during about 5 hours, the rate being about 11 grams per hour or about 6.5 grams per hour, per 100 grams of reaction mixture in the reaction vessel. Then a period of slowing rate of cumene hydroperoxide formation was observed lasting about one hour; after which the rate remained practically constant for the rest of the run at about 3.5 grams cumene hydroperoxide formed per hour, per 100 grams of reaction mixture in the vessel.

The drop in rate appears to be due to a poisoning effect preventing the desired contact of solid sodium plumbate with cumene being oxidized. It can be overcome by supplying fresh solid sodium plumbate when the rate begins to decrease. The poisoning may be due to a reaction coating and/or altering the sodium plumbate surface, such as reaction with small amounts of organic carboxylic acids formed during the oxidation.

We claim:

1. Process for producing an aralkyl hydroperoxide by oxidizing an aralkyl hydrocarbon, having at least one tertiary alkyl group attached via a tertiary carbon atom to the aryl ring, with elemental oxygen in liquid phase which comprises: providing and maintaining in contact with said aralkyl compound, during said oxidation, at least one solid material of the group consisting of the alkali metal and alkaline earth metal plumbates, bismuthates, stannates and antimonates.

2. Process of claim 1 wherein said aralkyl compound is an isopropylbenzene.

3. Process of claim 1 wherein said aralkyl compound is cumene and the quantity of said solid material maintained present is at least sufficient to maintain average oxidation rate of 1% per hour of cumene hydroperoxide produced during said oxidation and cumene hydroperoxide yield of 90% by weight of the total oxidation products when the cumene hydroperoxide concentration reaches 20% by weight in the oxidation reaction mixture.

4. Process of claim 3 wherein the quantities of said solid material supplied are about 0.05–1% by weight of the cumene supplied and the temperatures are in the range of about 60° C.–120° C.

5. Process of claim 4 wherein said solid material is sodium plumbate.

6. Process of claim 4 wherein said solid material is sodium bismuthate.

7. Process of claim 4 wherein said solid material is sodium stannate.

8. Process of claim 4 wherein said solid material is calcium stannate.

No references cited.

LEON ZITVER, *Primary Examiner.*

W. B. LONE, *Assistant Examiner.*